(No Model.)

C. F. HALL.
ICE CUTTER OR PICK.

No. 305,449. Patented Sept. 23, 1884.

WITNESSES.
J. C. Waterman.
Wm. C. Trumbull.

INVENTOR.
Charles F. Hall.
PER H. Lisle Fleming
ATT'Y.

UNITED STATES PATENT OFFICE.

CHARLES F. HALL, OF WEST TROY, NEW YORK.

ICE CUTTER OR PICK.

SPECIFICATION forming part of Letters Patent No. 305,449, dated September 23, 1884.

Application filed September 24, 1883. (No model.)

*To all whom it may concern:*

Be it known that I, CHARLES F. HALL, a citizen of the United States, and a resident of West Troy, in the county of Albany and State of New York, have invented a new and useful Improvement in Ice Cutters or Picks, of which the following is a specification.

This invention relates to that class of tools used for cutting, breaking, or chopping ice, and is more especially designed for removing icy substances from sidewalks, door-steps, &c.

It consists of a head or shank provided with a socket to receive a handle, and also with a slot or recess to receive a removable blade or knife, the object of the device being to readily and expeditiously remove and reverse or exchange said blade when worn or broken, all as hereinafter more fully described.

Figure 1:
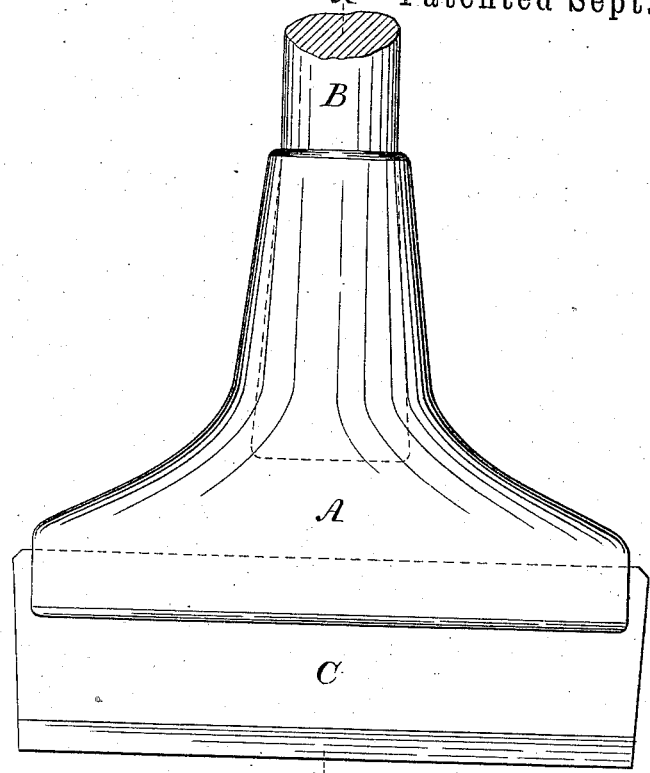
Figure 2:
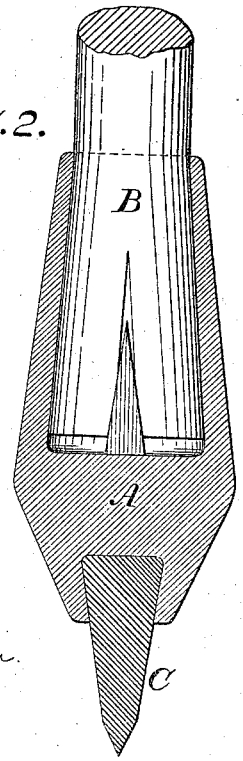
Figure 3:
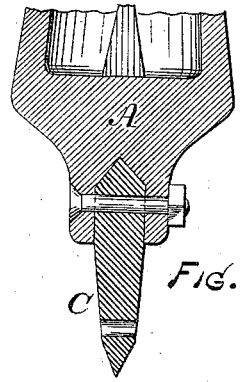

In the drawings, Figure 1 is an outer or side view of my improved device. Fig. 2 is a vertical transverse section at line *x x*, and Fig. 3 is a modification of same.

Similar letters of reference in each indicate corresponding parts.

By A is represented a broad flat head, preferably of malleable iron, with vertically-elongated shank, having orifice therein, forming socket to receive handle B. In the lower portion of head A is formed longitudinally a recess or slot, open at both ends to receive the removable blade C, which I propose to make of steel, and which may be of the double-wedge-shaped pattern shown in Fig. 3, with two cutting-edges, or of simpler wedged form, with but one cutting-edge, as shown in Fig. 2, the slotted recess in either case being formed to correspond, and when, as first described, the blade may be secured within said recess by suitable bolts, rivets, or set-screws.

In modification the blade and also the recess may be tapered slightly lengthwise, so that said blade may be inserted at larger end of dovetailed opening and retained therein by impingement with sides of same.

The operation of my improved device is such that the blade may, as aforesaid, be removed when worn or broken and another substituted, the double-wedge-shaped form being preferable, as when the cutting-edge previously used becomes damaged, by simply reversing the blade within recess the other edge may be brought into service.

I do not claim, broadly, the combination of cutting-blade and handle affixed thereto for the purpose specified, as I am aware that similar devices have been used; nor do I claim, broadly, a head or shank with a removable blade, as I am also aware that such expedients are common in other tools; but What I do claim as a new article of manufacture in implements of this class, and desire to secure by Letters Patent, is—

1. In an ice-pick, the combination of the head A, handle B, and removable blade C, constructed and arranged as herein shown and described, for the purpose specified.

2. In an ice-pick, a head or shank formed with a vertical socket to receive a handle, and also with a longitudinal slot or recess fitted to receive a correspondingly-shaped removable blade or knife, as and for the objects herein set forth.

In testimony whereof I affix my signature in presence of two witnesses.

CHARLES F. HALL.

Witnesses:
 G. C. WATERMAN,
 WM. C. TRUMBULL.